US007715505B2

(12) United States Patent
Rasmussen

(10) Patent No.: US 7,715,505 B2
(45) Date of Patent: *May 11, 2010

(54) ADAPTIVE SYNCHRONIZATION ENHANCEMENT TECHNIQUE FOR SERIAL MODULATED WAVEFORMS

(75) Inventor: Donald John Rasmussen, Fort Wayne, IN (US)

(73) Assignee: ITT Manufacturing Enterprises, Inc, Wilmington, DE (US)

( * ) Notice: Subject to any disclaimer, the term of this patent is extended or adjusted under 35 U.S.C. 154(b) by 1175 days.

This patent is subject to a terminal disclaimer.

(21) Appl. No.: 11/314,757

(22) Filed: Dec. 21, 2005

(65) Prior Publication Data

US 2009/0323867 A1    Dec. 31, 2009

Related U.S. Application Data

(60) Provisional application No. 60/703,095, filed on Jul. 28, 2005.

(51) Int. Cl.
*H04L 27/06* (2006.01)
(52) U.S. Cl. .................................... 375/343
(58) Field of Classification Search ........... 375/16, 375/340, 343, 322, 324, 336, 354, 366, 365, 375/362, 367, 368, 259, 271, 272, 274, 279, 375/280, 281, 130, 140, 147, 152; 708/1, 708/3, 5, 100, 200, 422–426, 800, 801, 813; 455/39, 59, 60, 205–209, 42
See application file for complete search history.

(56) References Cited

U.S. PATENT DOCUMENTS

| 3,938,045 A | 2/1976 | Mathwich |
| 4,057,759 A | 11/1977 | Genova et al. |
| 4,516,087 A | 5/1985 | Bruene |
| 4,680,777 A * | 7/1987 | Saha .......................... 375/280 |

(Continued)

FOREIGN PATENT DOCUMENTS

DE    102 49 413 A1    5/2004

(Continued)

OTHER PUBLICATIONS

Rasmussen, D.J. et al.: "Serial Demodulation of an OQPSK Direct Sequence Spread Signal", Tactical Communications Conference, 1992, vol. 1 Tactical Communications: Technology In Transition., Proceedings of the Fort Wayne, In, USA Apr. 28-30, 1992, New York, NY, Apr. 28, 1992, pp. 171-179.

(Continued)

*Primary Examiner*—David C Payne
*Assistant Examiner*—Vineeta S Panwalkar
(74) *Attorney, Agent, or Firm*—Ratner Prestia

(57) ABSTRACT

Methods and apparatus for synchronization (SYNC) detection of a received serial offset quadrature pulse shaped waveform modulated by a symbol SYNC sequence are provided. The waveform is serially demodulated into a serial baseband signal and correlated in parallel with segments of the symbol SYNC sequence. Correlation strength estimates of each of the correlated output signals are computed and used to adjust a SYNC threshold level. The correlation strength estimates or the correlated output signals are combined and a peak is determined in the resulting signal. The peak in the resulting signal is compared to the SYNC threshold level to detect synchronization.

26 Claims, 12 Drawing Sheets

U.S. PATENT DOCUMENTS

| | | | |
|---|---|---|---|
| 4,980,767 A * | 12/1990 | Chao et al. | 348/613 |
| 5,157,693 A | 10/1992 | Lemersal, Jr. et al. | |
| 5,177,765 A | 1/1993 | Holland et al. | |
| 5,195,108 A | 3/1993 | Baum et al. | |
| 5,414,729 A * | 5/1995 | Fenton | 375/149 |
| 5,428,647 A | 6/1995 | Rasky et al. | |
| 5,579,338 A | 11/1996 | Kojima | |
| 5,732,106 A | 3/1998 | Rasmussen et al. | |
| 5,818,867 A | 10/1998 | Rasmussen | |
| 6,002,710 A | 12/1999 | Hendrickson et al. | |
| 6,160,838 A * | 12/2000 | Shinohara et al. | 375/130 |
| 6,674,790 B1 | 1/2004 | Rasmussen et al. | |
| 6,859,463 B1 | 2/2005 | Mayor et al. | |
| 2001/0002919 A1 * | 6/2001 | Sourour et al. | 375/150 |
| 2003/0138031 A1 * | 7/2003 | Okubo et al. | 375/144 |

FOREIGN PATENT DOCUMENTS

EP          1241817 A1 *   9/2002

OTHER PUBLICATIONS

Carl Andren, "Short PN Sequences for Direct Sequences Spread Spectrum Radios", Apr. 11, 1997, pp. 1-4.
John Fakatselis, "Processing Gain for Direct Sequence Spread Spectrum Communication Systems and PRISM®", Intersil Corporation, 2000, pp. 1-4.
Chris Heegard et al., "High-Performance Wireless Ethernet", IEEE, Nov. 2001, pp. 64-73.

* cited by examiner $s(t) = x(t) \cos(2\pi f_0 t) + y(t) \sin(2\pi f_0 t)$ $x_1(t) = 2 \cdot x(t) \cos(2\pi f_0 t - \phi)|_{LPF}$
$x_1(t) = x(t) \cos(2\pi \Delta f t + \phi)$
$\quad + y(t) \sin(2\pi \Delta f t + \phi)$ $y_1(t) = 2 \cdot x(t) \sin(2\pi f_0 t - \phi)|_{LPF}$
$y_1(t) = -x(t) \sin(2\pi \Delta f t + \phi)$
$\quad + y(t) \cos(2\pi \Delta f t + \phi)$

ADAPTIVE SYNCHRONIZATION ENHANCEMENT TECHNIQUE FOR SERIAL MODULATED WAVEFORMS

CROSS REFERENCE TO RELATED APPLICATIONS

This application claims priority of U.S. Provisional Patent Application Ser. No. 60/703,095, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

FIELD OF THE INVENTION

The present invention relates to the field of communication systems. More specifically, the present invention relates to methods and apparatus for synchronization detection of a serial offset quadrature pulse shaped (such as phase shift keyed (PSK)) signal in a receiver.

SUMMARY OF THE INVENTION

The present invention is embodied in a method for synchronization (SYNC) detection of a received serial offset quadrature pulse shaped waveform modulated by a predetermined SYNC sequence of symbols. The method serially demodulates the received waveform into a serial baseband signal. The serial baseband signal has the same predetermined SYNC sequence of symbols. The method also correlates the serial baseband signal with a plurality of segments of the SYNC sequence of symbols to form a plurality of parallel correlated output signals. The plurality of segments form the predetermined SYNC sequence of symbols. The method further combines the parallel correlated output signals to form a combined correlation signal and detects SYNC using the combined correlation signal.

The present invention is also embodied in a method for SYNC detection of a received serial offset quadrature pulse shaped waveform modulated by a predetermined SYNC sequence of symbols. The method serially demodulates the is received waveform into a serial baseband signal. The serial baseband signal has the same predetermined SYNC sequence of symbols. The method also correlates the serial baseband signal with a plurality of segments of the SYNC sequence of symbols to form a plurality of parallel correlated output signals. The plurality of segments form the predetermined SYNC sequence of symbols. The method further computes correlation strength estimates of each of the parallel correlated output signals. The method further combines the correlation strength estimates to form a combined correlation signal and detects SYNC using the combined correlation signal.

The present invention is further embodied in a receiver. The receiver includes a demodulator for serially demodulating a received waveform into a serial baseband signal. The serial baseband signal has a predetermined SYNC sequence of symbols. The receiver further includes a matched filter for correlating the serial baseband signal with a plurality of segments of the SYNC sequence of symbols to form a plurality of parallel correlated output signals. The plurality of segments form the predetermined SYNC sequence of symbols.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

An embodiment of the present invention uses a serial quasi-bandlimited-minimum shift keyed (SQBL-MSK) signal as a modulation waveform. The SQBL-MSK signal enables a serial correlation structure to be used, with an in-phase (I) and quadrature (Q) correlator using the same synchronization (SYNC) sequence. Standard parallel QBL-MSK uses a four correlator structure based on the even and odd symbols on the I and Q sequence. The serial correlation structure used for synchronization (SYNC) detection and short segment correlations for frequency estimation advantageously provides a simplified binary phase shift keyed (BPSK) correlation operation versus a parallel structure. This reduces the complexity of the SYNC and frequency estimation operation.

Although QBL-MSK is selected as an exemplary modulation waveform, it is understood that other constant or near constant envelope modulation waveforms, such as Offset Quadrature Phase Shift Keying (OQPSK), Minimum Shift Keying (MSK), Gaussian MSK, Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) methods may be used for the modulation. Non-constant envelope modulation waveforms, such as BPSK and filtered BPSK, may also be used for the modulation.

To simplify the SYNC and frequency estimation operation, it is desirable to implement serial formatting on these modulation waveforms. Serial formatting for quadrature pulse-shaped signals may be applied by adding a serial formatting term to the modulation waveform, which multiplies the non-return to zero (NRZ) symbol sequence with a repetitive 1, 1, −1, −1 sequence. For SQBL-MSK, the modulation waveform for the SYNC portion of the waveform can be written as follows:

$$s(t) = \left[\sum_{i=0}^{M-1}(-1)^i c_{2i} \cdot p(t-2iT_s)\right]\cos(2\pi f_o t) + \quad \text{(eqn 1)}$$

$$\left[\sum_{i=0}^{M-1}(-1)^i c_{2i+1} \cdot p(t-[2i+1]T_s)\right]\sin(2\pi f_o t)$$

and $$p(t) = \begin{cases} \left[\dfrac{\sin\left(\dfrac{\pi t}{2T_s}\right)}{\left(\dfrac{\pi t}{2T_s}\right)}\right]^3; & -2T_s \leq t \leq 2T_s \\ 0; & \text{elsewhere.} \end{cases} \quad \text{(eqn 2)}$$

For the data modulated SQBL-MSK waveform equation given above, $T_s$ represents the symbol period, $c_i$ represents the SYNC symbols at time $iT_s$, 2M is the number of symbols in the SYNC sequence, p(t) is the QBL pulse-shaping function, $f_o$ is the carrier center frequency, and the $(-1)^i$ terms which multiplies the symbol value represents the serial formatting. For 128 symbol SYNC, for example, M is equal to 64. The SYNC symbols ($c_i$) take on either a +1 or −1 value.

Figure 1:
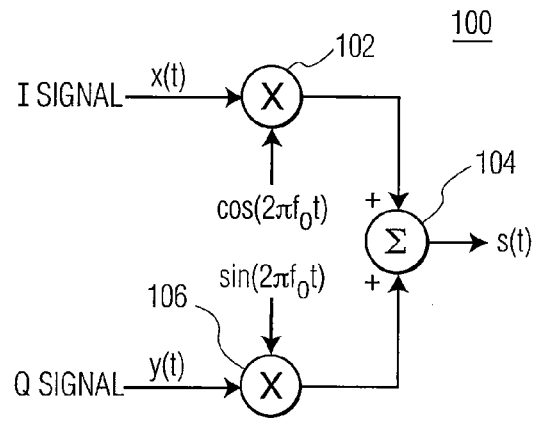
FIG. 1 is a block diagram of a SQBL-MSK modulator, in accordance with an embodiment of the present invention.

FIG. 1 shows a block diagram of SQBL-MSK modulator 100 having I {x(t)} and Q {y(t)} as input signals. As shown in FIG. 1, the I and Q data signals are mixed with a carrier signal at mixers 102 and 106. The outputs are then combined at summer 104. The resulting signal s(t) is the modulation waveform. The equations for the I {x(t)} and Q {y(t)} signals modulating the carrier during the SYNC section of the waveform are obtained from equation 1 as follows:

$$x(t) = \left[\sum_{i=0}^{M-1}(-1)^i c_{2i} \cdot p(t-2iT_s)\right] \quad \text{(eqn 3)}$$

and $$y(t) = \left[\sum_{i=0}^{M-1}(-1)^i c_{2i+1} \cdot p(t-[2i+1]T_s)\right]. \quad \text{(eqn 4)}$$

Figure 2:
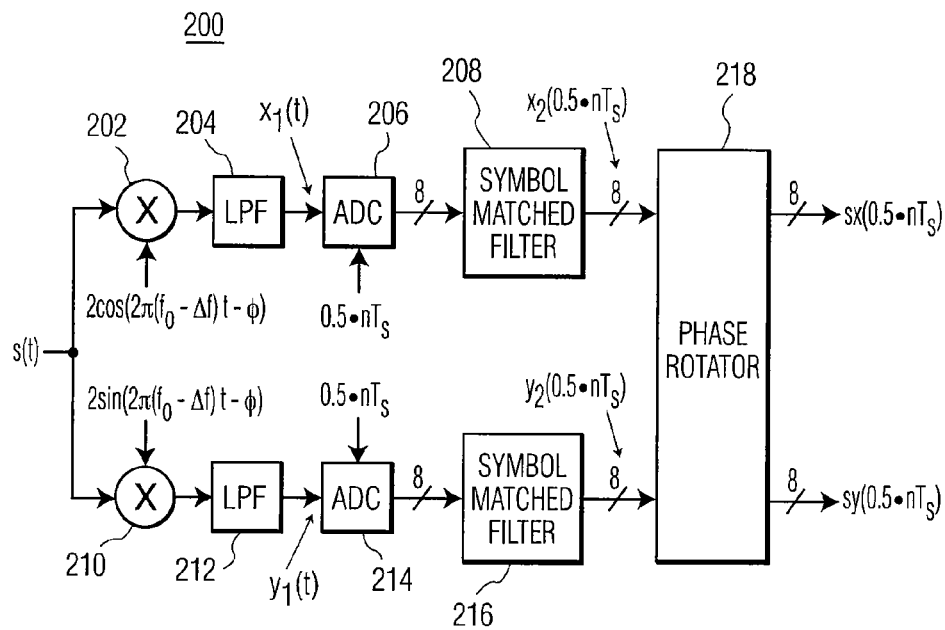
FIG. 2 is a block diagram of a SQBL-MSK demodulator front end, in accordance with an embodiment of the present invention.

FIG. 2 shows a block diagram for a SQBL-MSK demodulator front-end of receiver 200, which down-converts the received signal to baseband I and Q signals, digitizes the I and Q signals, digitally filters the I and Q signals with the respective symbol matched filters and performs a phase rotator operation to generate the serial I and Q signals. As shown in FIG. 2, the received signal is mixed by mixers 202 and 210 with respective quadrature signals at the carrier frequency, resulting in the desired baseband I and Q signals (mixing difference term) and the undesired signal at twice the carrier frequency (mixing sum term). Lowpass filtering by LPF 204 and LPF 212 follows the down-converter function to remove the respective undesired mixing summation term. Baseband I and Q signals are digitized by the I and Q analog-to-digital converters (ADC) 206 and 214, respectively. As shown in FIG. 2, the sampling rate is equal to twice the symbol rate.

Following digitization, the I and Q signals are filtered by respective symbol matched filters 208 and 216, which maximize the signal-to-noise ratio (SNR). Phase rotator 218 converts the respective I and Q symbol matched filter outputs, from symbol matched filters 208 and 216, into serial I and Q signals, which are sent to a SYNC detection operation and demodulation section (described later).

The QBL-MSK symbol matched filter coefficients are based on the QBL-MSK pulse-shaping function defined by:

$$p(t) = \begin{cases} \left[\dfrac{\sin\left(\dfrac{\pi[t-2T_s]}{2T_s}\right)}{\left(\dfrac{\pi[t-2T_s]}{2T_s}\right)}\right]^3; & 0 \leq t \leq 4T_s \\ 0; & \text{elsewhere.} \end{cases} \quad \text{(eqn 5)}$$

where $T_s$ corresponds to the symbol period for the SYNC sequence.

Because the QBL-MSK pulse-shaping function is non-zero over a four symbol period interval, the digital QBL-MSK symbol matched filter operating at twice the symbol rate may include 9 samples defined by the following equation:

$$p(k) = \left[\dfrac{\sin\left(\dfrac{\pi[0.5 \cdot k - 2]}{2}\right)}{\left(\dfrac{\pi[0.5 \cdot k - 2]}{2}\right)}\right]^3; k = 0, 1, 2, 3, \ldots, 8. \quad \text{(eqn 6)}$$

Recognizing that the filter value for k equal to 0 and 8 is equal to zero, the digital QBL-MSK symbol matched filter response can be simplified to 7 samples defined by the following equation:

$$p(k) = \left[\dfrac{\sin\left(\dfrac{\pi[0.5 \cdot k - 1.5]}{2}\right)}{\left(\dfrac{\pi[0.5 \cdot k - 1.5]}{2}\right)}\right]^3; k = 0, 1, 2, 3, \ldots, 6. \quad \text{(eqn 7)}$$

Figure 3:
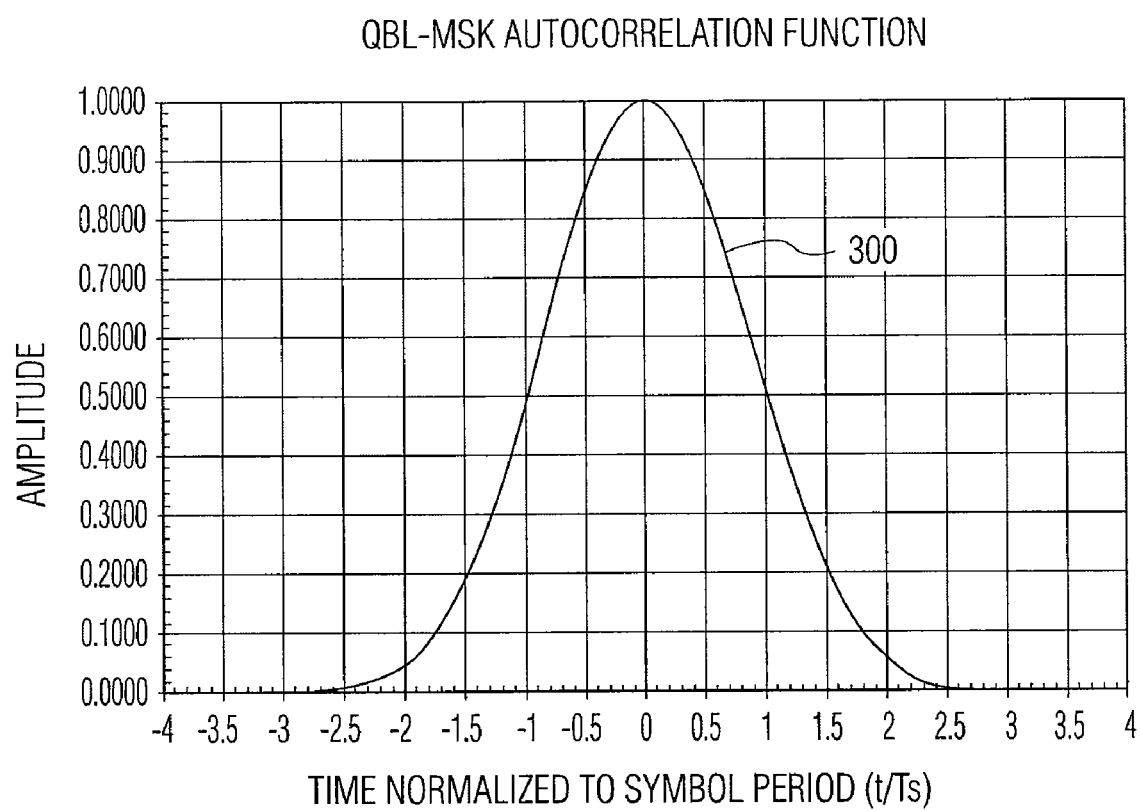
FIG. 3 is a plot of a QBL-MSK autocorrelation function, in accordance with an embodiment of the present invention.

Convolution of the QBL-MSK symbol pulse shape with the QBL-MSK symbol matched filter results in the QBL-MSK autocorrelation function {g(t)}. FIG. 3 shows a plot of QBL-MSK autocorrelation function 300, {g(t)}. As shown in this figure, autocorrelation function 300 is zero or near zero for time $2.5T_s$ from the desired optimum sampling point (time 0).

Using the QBL-MSK autocorrelation function {g(t)}, the I and Q signals outputted from the symbol matched filters are:

$$x_2(0.5nT_s) = \left[\sum_{i=0}^{M-1}(-1)^i c_{2i} \cdot g(0.5nT_s - 2iT_s)\right]\cos(\pi n\Delta fT_s + \phi) + \quad \text{(eqn 8)}$$
$$\left[\sum_{i=0}^{M-1}(-1)^i c_{2i+1} \cdot g(0.5nT_s - [2i+1]T_s)\right]\sin(\pi n\Delta fT_s + \phi)$$

and $$y_2(0.5nT_s) = -\left[\sum_{i=0}^{M-1}(-1)^i c_{2i} \cdot g(0.5nT_s - 2iT_s)\right]\sin(\pi n\Delta fT_s + \phi) + \quad \text{(eqn 9)}$$
$$\left[\sum_{i=0}^{M-1}(-1)^i c_{2i+1} \cdot g(0.5nT_s - [2i+1]T_s)\right]\cos(\pi n\Delta fT_s + \phi)$$

where $\Delta f$ is the carrier frequency error and $\phi$ is the carrier phase change.

Phase rotator 218 enables the SQBL-MSK modulated signal to be serially demodulated, thus allowing the SYNC I and Q correlation operations to operate against the same SYNC symbol sequence versus having to separate the SYNC symbol sequence into even and odd symbols, as is typically performed by a parallel correlator. The two sample per symbol I and Q signals, out of phase rotator 218, are sent to a SYNC detection module (for example FIG. 6) which determines the timing control for selecting the proper sample and performs an adaptive SYNC threshold process based on a correlation segment of the SYNC sequence.

Figure 4:
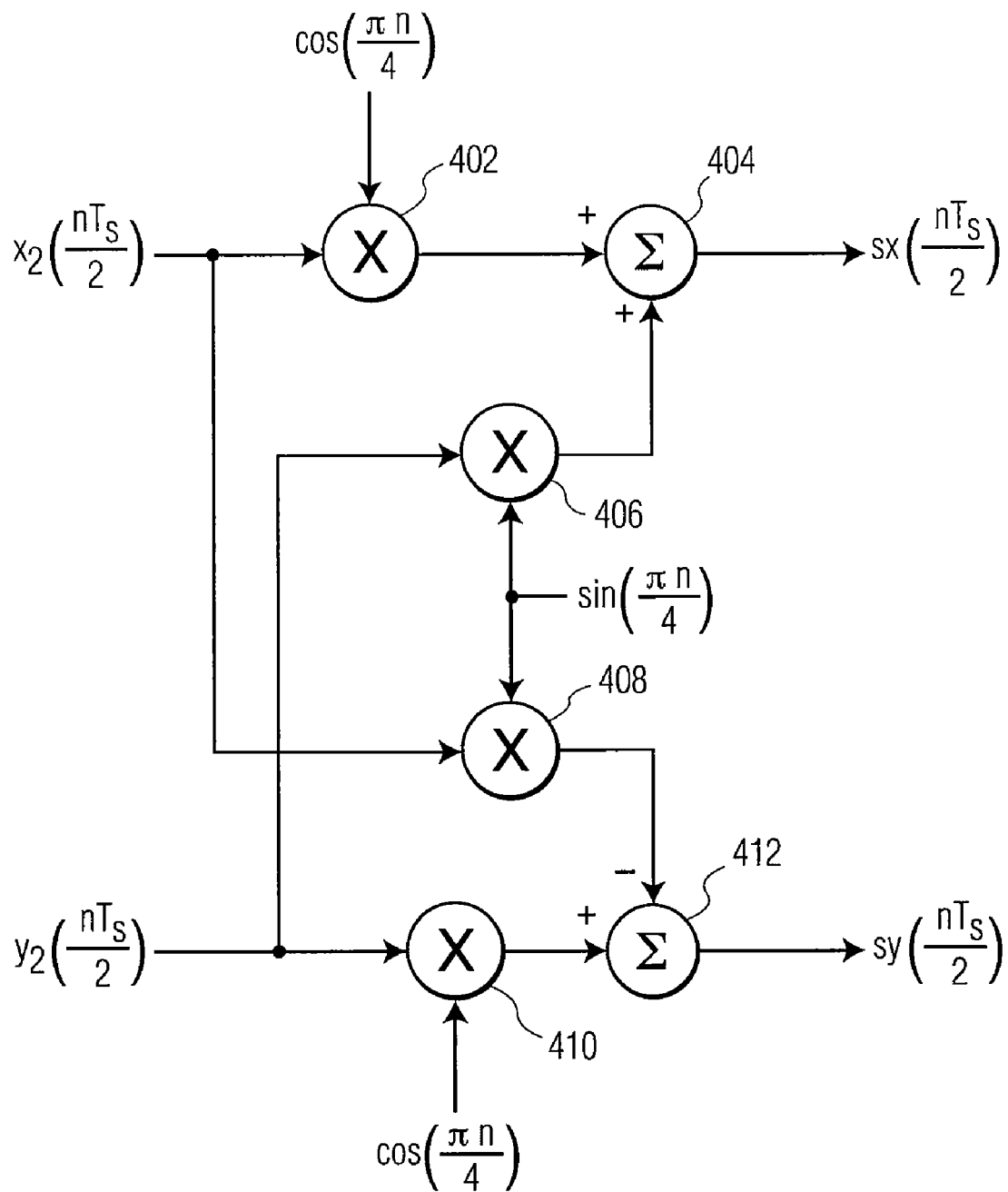
FIG. 4 is a block diagram of a phase rotator, in accordance with an embodiment of the present invention.
Figure 5:
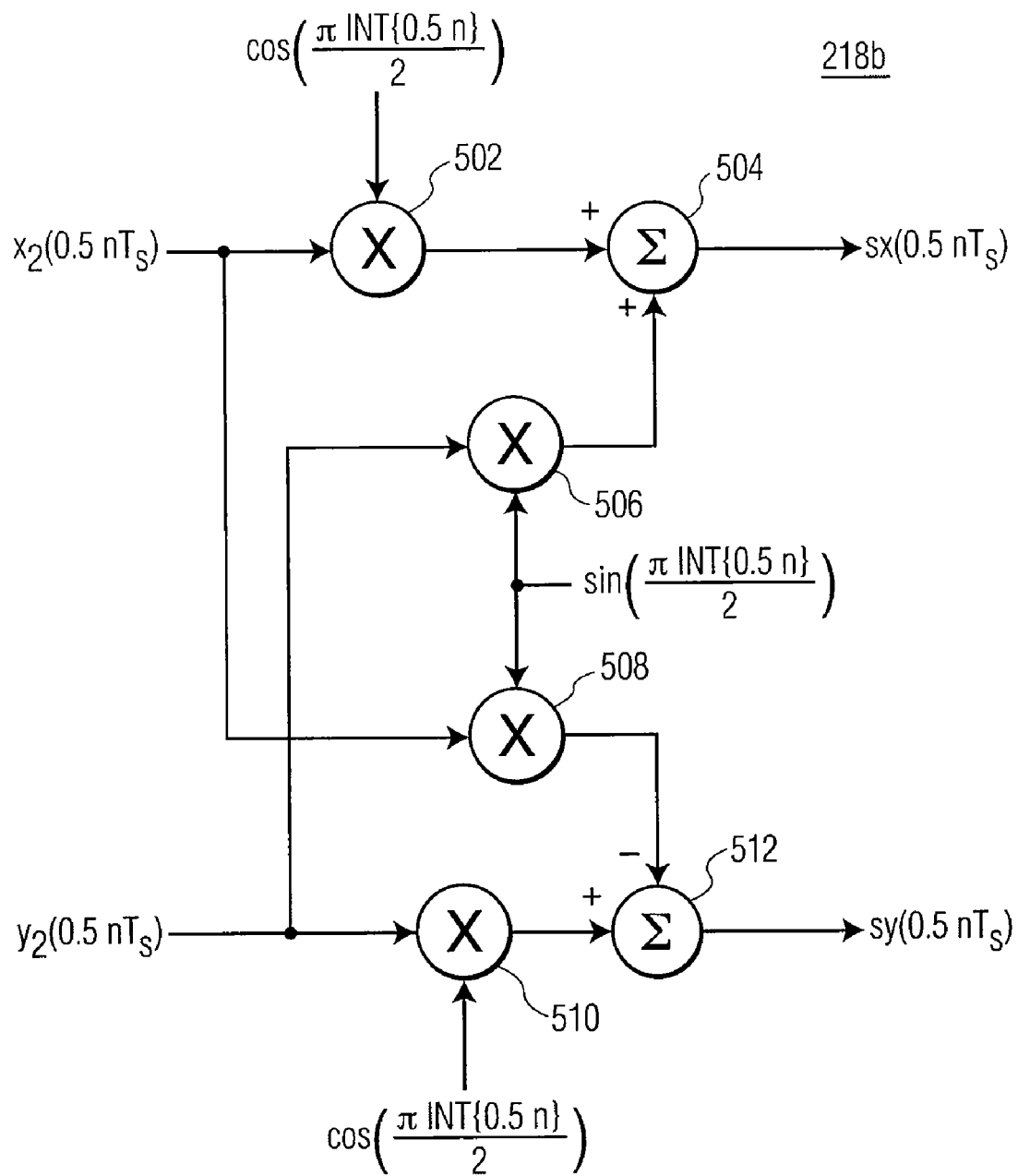
FIG. 5 is a block diagram of another phase rotator, in accordance with an embodiment of the present invention.

Phase rotator 218 may be implemented by a first phase rotator, as designated by 218a in FIG. 4, or a more simplified phase rotator, as designated by 218b in FIG. 5. The simplified phase rotator offers a lower complexity. Either phase rotator 218a or 218b may be used to implement the serial demodulation of the present invention.

FIG. 4 shows first phase rotator 218a for implementing the serial is demodulation. As shown, the I and Q symbol matched filter outputs, represented by $x_2(nT_s/2)$ and $y_2(nT_s/2)$, enter phase rotator 218a to be mixed with a $\cos(\pi n/4)$ signal by respective mixers 402 and 410 and a $\sin(\pi n/4)$ signal at mixers 406 and 408. The outputs from mixers 402 and 406 are combined by summer 404 and the outputs from mixers 408 and 410 are combined by summer 412 (actually subtractor 412).

FIG. 5 shows simplified phase rotator 218b for implementing the serial demodulation. As shown, the I and Q symbol matched filter outputs, represented by $x_2(nT_s/2)$ and $y_2(nT_s/2)$, enter phase rotator 218b to be mixed with a $\cos[\pi\text{INT}(0.5n)/2]$ signal by respective mixers 502 and 510 and a $\sin[\pi\text{INT}(0.5n)/2]$ signal at mixers 506 and 508, where INT represents an integer. The outputs from mixers 502 and 506 are combined by summer 504 and the outputs from mixers 508 and 510 are combined by summer 512 (actually subtractor 512).

The serial I and Q signals outputted from first phase rotator 218a (FIG. 4) are given by the following equations:

$$sx(0.5nT_s) = \quad \text{(eqn 10)}$$
$$x_2(0.5nT_s + \Delta T_s)\cdot\cos\left(\frac{\pi n}{4} + \theta\right) + y_2(0.5nT_s + \Delta T_s)\cdot\sin\left(\frac{\pi n}{4} + \theta\right)$$

and

-continued $$sy(0.5nT_s) = -x_2(0.5nT_s + \Delta T_s)\cdot\sin\left(\frac{\pi n}{4} + \theta\right) + \quad \text{(eqn 11)}$$
$$y_2(0.5nT_s + \Delta T_s)\cdot\cos\left(\frac{\pi n}{4} + \theta\right);$$

where $\Delta T_s$ is the timing error ($\pm T_s/4$ maximum) not removed by the SYNC timing correction and $\theta$ represents one of four possible timing conditions the phase rotator may have, conditions which depend on timing errors. The phase associated with the phase rotator is equal to either −90, 0, 90, or 180 degrees.

The second, simplified phase rotator 218b (FIG. 5) may be selected based upon simplification of the mathematical equations. Simplified phase rotator 218b introduces an additional phase change of −45 degrees every other sample.

Results derived from using the first phase rotator 218a (FIG. 4) directly apply to simplified phase rotator 218b (FIG. 5). Inserting the equations for $x_2(0.5nT_s)$ and $y_2(0.5nT_s)$ and applying simplifications to these equations provide the following equations:

$$sx(0.5nT_s) = \quad \text{(eqn 12)}$$
$$\left[\sum_{i=0}^{2M-1} c_i \cdot g([0.5nT_s + \Delta T_s] - iT_s)\cdot\cos\left(\frac{\pi[0.5nT_s - iT_s]}{2T_s}\right)\right]$$
$$\cos(2\pi[0.5n\Delta fT_s] + \theta_c) -$$
$$\left[\sum_{i=0}^{M-1} c_i \cdot g([0.5nT_s + \Delta T_s] - iT_s)\cdot\sin\left(\frac{\pi[0.5nT_s - iT_s]}{2T_s}\right)\right]$$
$$\sin(2\pi[0.5n\Delta fT_s] + \theta_c)$$

and $$sy(0.5nT_s) = \quad \text{(eqn 13)}$$
$$-\left[\sum_{i=0}^{2M-1} c_i \cdot g([0.5nT_s + \Delta T_s] - iT_s)\cdot\cos\left(\frac{\pi[0.5nT_s - iT_s]}{2T_s}\right)\right]$$
$$\sin(2\pi[0.5n\Delta fT_s] + \theta_c) -$$
$$\left[\sum_{i=0}^{M-1} c_i \cdot g([0.5nT_s + \Delta T_s] - iT_s)\cdot\sin\left(\frac{\pi[0.5nT_s - iT_s]}{2T_s}\right)\right]$$
$$\cos(2\pi[0.5n\Delta fT_s] + \theta_c)$$

where $$\theta_c = \theta + \phi. \quad \text{(eqn 14)}$$

The phase error introduced by the down-conversion operation ($\phi$) and the phase error introduced by the phase rotator ($\theta$) may be combined into a total carrier phase error term ($\theta_c$). From these equations, two key features of serial demodulation may be seen. First, the serial formatting factor $(-1)^i$ seen in the modulation equation (eqn 1) can be removed. Secondly, it may be seen that the I and Q baseband signals consist of the filtered SYNC sequence multiplied by either a cosine or a sine weighting function. From FIG. 3, the QBL-MSK autocorrelation function 300 is nonzero for $\pm 2.5\,T_s$ about the ideal SYNC time of zero. Because the cosine weighting function forces the QBL-MSK autocorrelation function to zero at times $-T_s+\Delta T_s$ and $T_s+\Delta T_s$, only the QBL-MSK terms at $-2T_s+\Delta T_s$, $\Delta T_s$, and $2T_s+\Delta T_s$ need to be considered for each cosine weighted QBL-MSK autocorrelation symbol response.

Similarly the sine weighting function forces the QBL-MSK autocorrelation function to zero at times $-2T_s+\Delta T_s$, $\Delta T_s$, and $2T_s+\Delta T_s$, so only the QBL-MSK terms at $-T_s+\Delta T_s$ and $T_s+\Delta T_s$ need to be considered for each sine weighted QBL-MSK autocorrelation symbol response.

Using this information and the optimal symbol sample time, the equations for the serial I and Q signal can be rewritten as follows:

$$sx(nT_s) = \qquad\qquad\qquad\qquad\qquad\qquad\qquad\text{(eqn 15)}$$

$$\sum_{i=0}^{2M-1} c_i \cdot \{g(\Delta T_s)\delta(n-i)\cdot\cos(2\pi n\Delta fT_s + \theta_c) - g(-2T_s + \Delta T_s)$$

$$\delta(n+2-i)\cdot\cos(2\pi[n+2]\Delta fT_s + \theta_c) - g(2T_s + \Delta T_s)$$

$$\delta(n-2-i)\cdot\cos(2\pi[n-2]\Delta fT_s + \theta_c)\} - \left[\sum_{i=0}^{2M-1} c_i \cdot \right.$$

$$\{-g(-T_s + \Delta T_s)\delta(n+1-i)\cdot\sin(2\pi[n+1]\Delta fT_s + \theta_c) +$$

$$\left. g(T_s + \Delta T_s)\delta(n-1-i)\cdot\sin(2\pi[n-1]\Delta fT_s + \theta_c)\}\right]$$

and $$sy(nT_s) = \qquad\qquad\qquad\qquad\qquad\qquad\qquad\text{(eqn 16)}$$

$$-\left[\sum_{i=0}^{2M-1} c_i \cdot \{g(\Delta T_s)\delta(n-i)\cdot\sin(2\pi n\Delta fT_s + \theta_c) - g(-2T_s + \Delta T_s)\right.$$

$$\delta(n+2-i)\cdot\sin(2\pi[n+2]\Delta fT_s + \theta_c) -$$

$$g(2T_s + \Delta T_s)\delta(n-2-i)\cdot$$

$$\left.\sin(2\pi[n-2]\Delta fT_s + \theta_c)\}\right] - \left[\sum_{i=0}^{2M-1} c_i \cdot \right.$$

$$\{-g(-T_s + \Delta T_s)\delta(n+1-i)\cdot\cos(2\pi[n+1]\Delta fT_s + \theta_c) +$$

$$\left. g(T_s + \Delta T_s)\delta(n-1-i)\cdot\cos(2\pi[n-1]\Delta fT_s + \theta_c)\}\right]$$

where $\delta(n)$ is the unit impulse function, which is equal to 1 for n equal to zero and equal to 0 for all other values of n. The serial I and Q signals can be rewritten as follows:

$$sx(nT_s) = \qquad\qquad\qquad\qquad\qquad\qquad\qquad\text{(eqn 17)}$$

$$\sum_{i=0}^{2M-1} [c_i \cdot \alpha_0 - c_{i+2} \cdot \alpha_2 - c_{i-2} \cdot \alpha_2]\delta(n-i)\cos(2\pi n\Delta fT_s + \theta_c) -$$

$$\sum_{i=0}^{2M-1} [-c_{i+1} \cdot \alpha_{-1} + c_{i-1} \cdot \alpha_1]\delta(n-i)\sin(2\pi n\Delta fT_s + \theta_c)$$

and $$sy(nT_s) = \qquad\qquad\qquad\qquad\qquad\qquad\qquad\text{(eqn 18)}$$

$$-\sum_{i=0}^{2M-1} [c_i \cdot \alpha_0 - c_{i+2} \cdot \alpha_{-2} - c_{i-2} \cdot \alpha_2]\delta(n-i)\sin(2\pi n\Delta fT_s + \theta_c) -$$

$$\sum_{i=0}^{2M-1} [-c_{i+1} \cdot \alpha_{-1} + c_{i-1} \cdot \alpha_1]\delta(n-i)\cos(2\pi n\Delta fT_s + \theta_c);$$

where $$\alpha_n = g(nT_s + \Delta T_s). \qquad\qquad\qquad\qquad\text{(eqn 19)}$$

From these equations, it may be seen that the serial I and Q signals consist of a desired SYNC sequence multiplied by the sinusoidal carrier frequency error term and undesired cross-correlation property of the SYNC sequence.

For SYNC sequences with low cross-correlation property over the correlation segments, these cross-correlation terms are typically negligible. Removing these terms from the serial I and Q signals results in the following equations:

$$sx_a(nT_s) = \sum_{i=0}^{2M-1} [c_i \cdot \alpha_0]\delta(n-i)\cos(2\pi n\Delta fT_s + \theta_c) \qquad\text{(eqn 20)}$$

$$= \sum_{i=0}^{2M-1} [c_i \cdot g(\Delta T_s)]\delta(n-i)\cos(2\pi n\Delta fT_s + \theta_c)$$

and $$sy_a(nT_s) = -\sum_{i=0}^{2M-1} [c_i \cdot \alpha_0]\delta(n-i)\sin(2\pi n\Delta fT_s + \theta_c) \qquad\text{(eqn 21)}$$

$$= -\sum_{i=0}^{2M-1} [c_i \cdot g(\Delta T_s)]\delta(n-i)\sin(2\pi n\Delta fT_s + \theta_c).$$

Performing the same simplification operations with the other symbol sample times results in the equation for the serial I and Q signals at the other sampling times:

$$sx_a(nT_s + 0.5) = \qquad\qquad\qquad\qquad\qquad\text{(eqn 22)}$$

$$\sum_{i=0}^{2M-1} [c_i \cdot g(0.5T_s + \Delta T_s)]\delta(n-i)\cos(2\pi n\Delta fT_s + \pi\Delta fT_s\theta_c)$$

and $$sy_a(nT_s + 0.5) = \qquad\qquad\qquad\qquad\qquad\text{(eqn 23)}$$

$$-\sum_{i=0}^{2M-1} [c_i \cdot g(0.5T_s + \Delta T_s)]\delta(n-i)\sin(2\pi n\Delta fT_s + \pi\Delta fT_s\theta_c).$$

Figure 6:
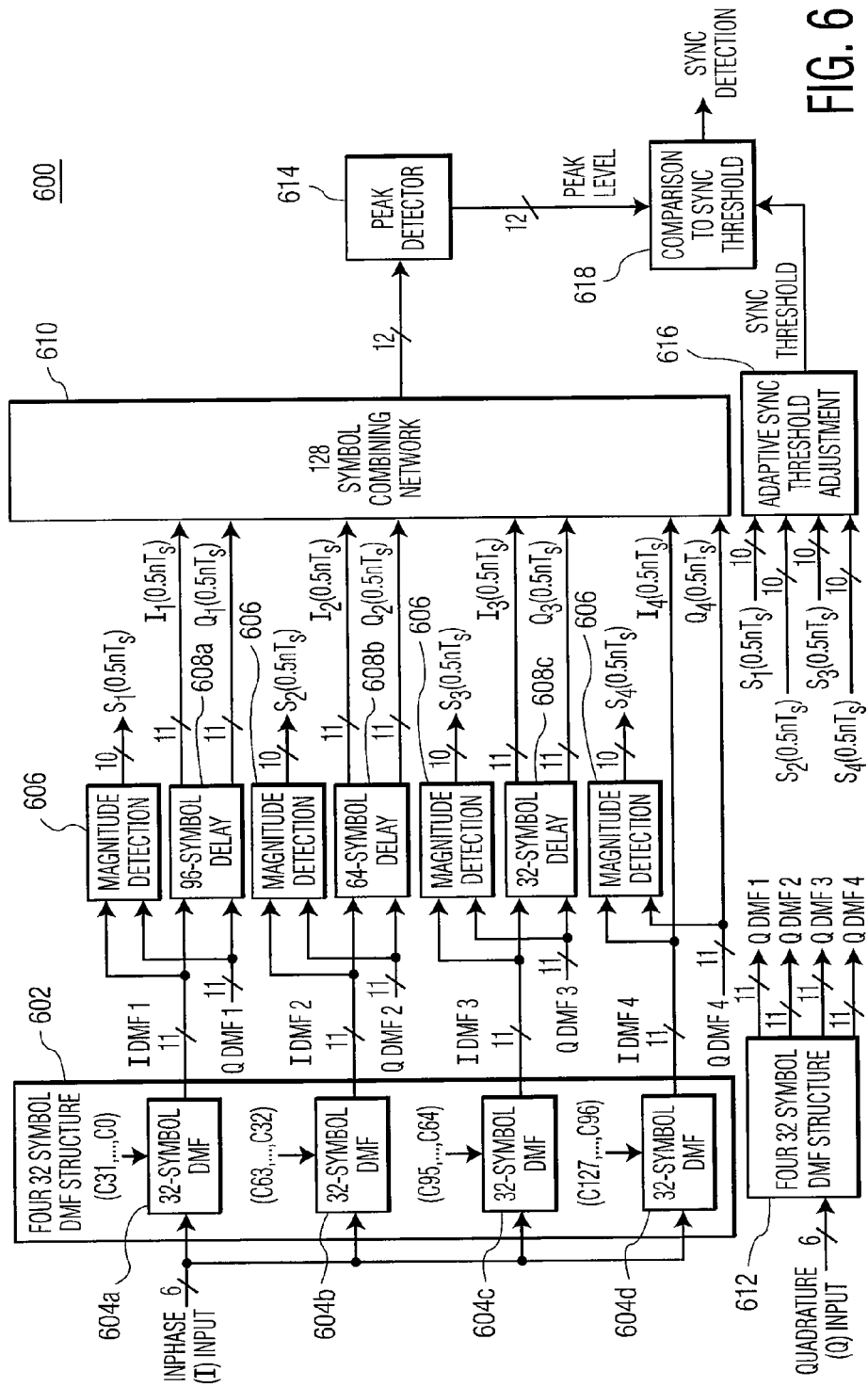
FIG. 6 is a block diagram of an adaptive SYNC detector and SYNC threshold adaptor, in accordance with an embodiment of the present invention.

FIG. 6 shows SYNC detection module 600 which performs SYNC detection and includes an adaptive SYNC threshold adjustment, using the simplified (based on SYNC sequence assumptions given above) serial I and Q samples, shown in equations 20 to 23. The serial I and Q signals are sent to respective four 32 symbol digital matched filters (DMFs) 602 and 612. Each DMF 602 and 612 includes four 32 symbol DMFs 604a-d (not shown for DMF 612), each of which implements a sliding correlation operation over the four 32 symbol sectors of the 128 symbol SYNC sequence.

The structure for each of 32 symbol DMFs 604a-d is the same as the 32 symbol I DMF for the SYNC sequence $c_0$ to $c_{31}$ (shown in FIG. 7), except that the 32 symbol SYNC reference may be different.

Figure 7:
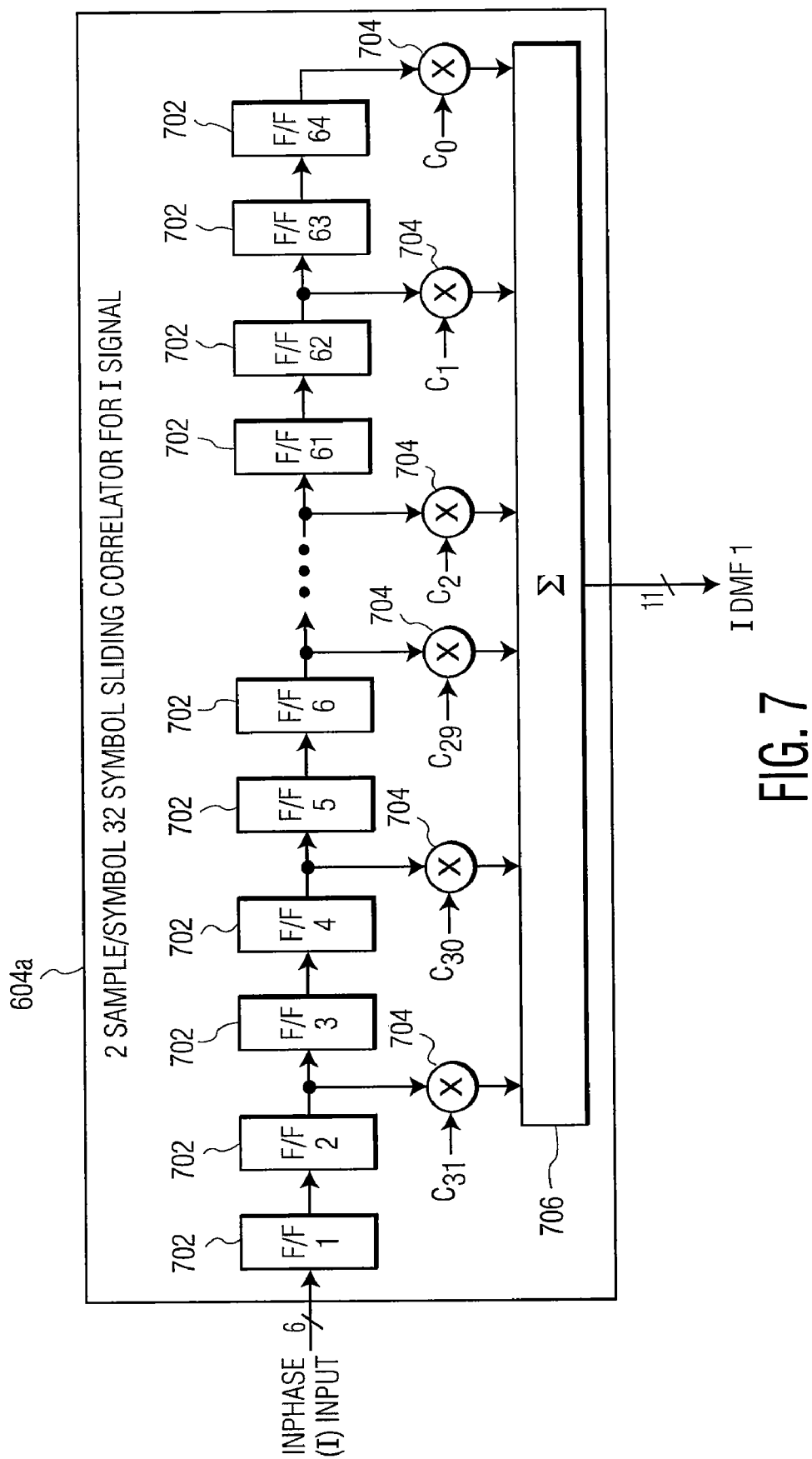
FIG. 7 is a block diagram of a 32 symbol digital matched filter (DMF) structure, in accordance with an embodiment of the present invention.

Referring to FIG. 7, there is shown 32 symbol DMF 604a for SYNC sequence $c_0$ to $c_{31}$. In an exemplary embodiment, time delay elements include flip-flops (F/F) 702. Input serial I signal for DMF 604a is serially delayed using 64 F/Fs 702. Because the input serial I and Q signals are each sampled at twice the symbol rate, the output of every other F/F 702 is provided to mixers 704 for multiplying with respective SYNC sequence coefficients $c_0$ to $c_{31}$. The outputs from all 32 mixers 704 are summed by summer 706 to form the DMF output signal, I DMF 1, for example. Similar operations are desirably performed with DMF 604b-d for the remaining input serial I signal components, and similar operations are desirably performed with the four 32 symbol DMF 612 for respective components of the input serial Q signal.

The four 32 symbol DMF sectors, shown in FIG. 6, minimize the correlation degradation introduced by the carrier frequency error ($\Delta f$). To minimize the correlation degradation to less than 3 dB, the phase drift across the 32 symbol DMF sector for a maximum frequency error is set to 45 degrees.

Figure 8:
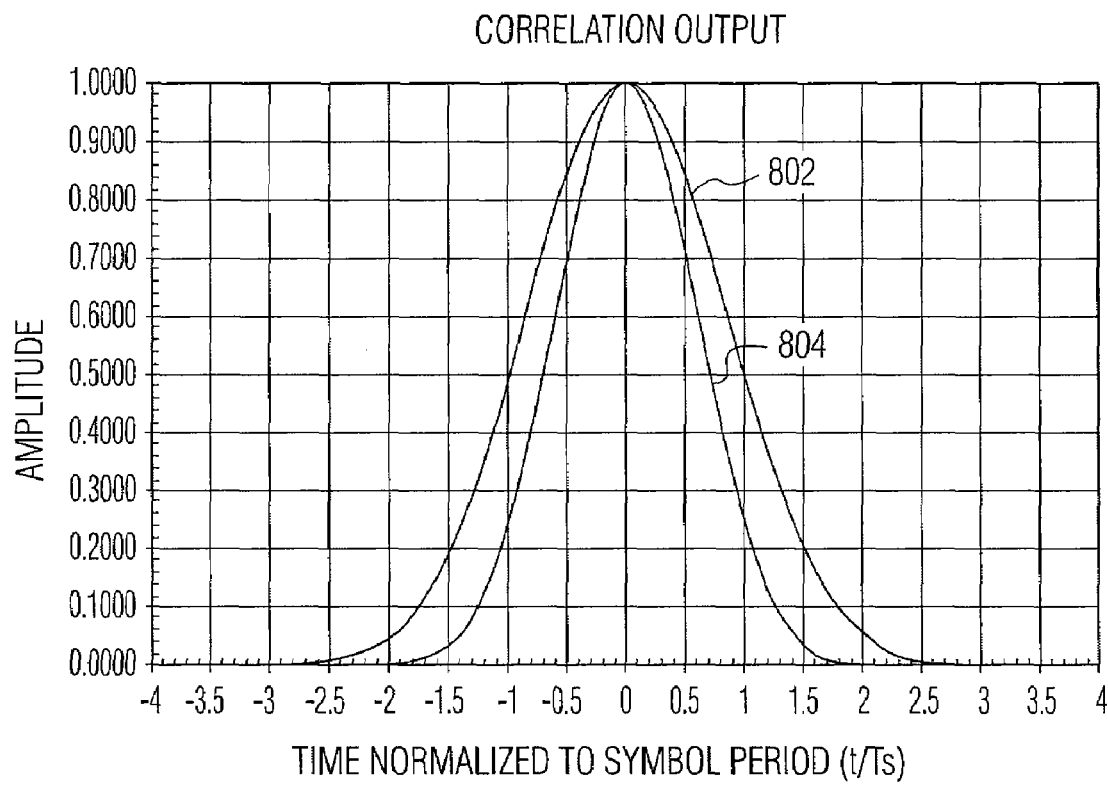
FIG. 8 depicts plots of QBL-MSK and squared QBL-MSK autocorrelation curves for use with the SYNC detector of FIG. 6.

The I and Q output signal for each of the 32 symbol DMF about the correlation peak, at n equal to zero, is given by the following equations:

$$I_k(0.5nT_s + [k-1]T_s) = 32 \cdot \left[\frac{\sin(32\pi\Delta fT_s)}{32 \cdot \sin(\pi\Delta fT_s)}\right] \cdot g(nT_s + \Delta T_s) \cdot \qquad \text{(eqn 24)}$$
$$\cos\left(2\pi[32(k-1)]\Delta fT_s + 31\pi\Delta fT_s + \pi[n\Delta fT_s] + \frac{\pi n}{4} + \theta_c\right)$$

and $$Q_k(0.5nT_s + [k-1]T_s) = -32 \cdot \left[\frac{\sin(32\pi\Delta fT_s)}{32 \cdot \sin(\pi\Delta fT_s)}\right] \cdot g(nT_s + \Delta T_s) \cdot \qquad \text{(eqn 25)}$$
$$\sin\left(2\pi[32(k-1)]\Delta fT_s + 31\pi\Delta fT_s + \pi[n\Delta fT_s] + \frac{\pi n}{4} + \theta_c\right);$$

where k=1, 2, 3, and 4 represents the four 32 symbol DMF outputs from 32 symbol DMFs 604*a-d*, n is the sample number about the peak QBL-MSK correlation function, at n equal to zero and the QBL-MSK correlation function represented by g( ) is non-zero when its argument is between the time interval of $-3T_s$ and $3T_s$, as shown in FIG. 8.

The [k−1] $T_s$ term in equations 24 and 25 shows that the QBL-MSK correlation function is not phase aligned. The amplitude term multiplying the QBL-MSK correlation function {g( )} may be determined by the carrier frequency error, the number of symbol correlations in the DMF, and the symbol period.

The maximum carrier frequency for this approach may be set by the following equation:

$$M\pi\Delta f_{max}T_s = \frac{\pi}{4}; \qquad \text{(eqn 26)}$$

where M is the number of correlation samples, which is equal to 32 for the exemplary embodiment. This relationship minimizes the reduction in the amplitude by less than 3 dB.

It is desirable to reduce the number of symbols correlated in the DMF if the carrier frequency is larger than the maximum carrier frequency determined by this equation. For example, the DMF symbols may be reduced from 32 to 16, which increases the maximum carrier frequency error by a factor of 2.

By partitioning the 128 symbol SYNC sequence into small sectors, the maximum carrier frequency error is increased. The cross-correlation properties of the SYNC sequence increases, which increases the probability of a false SYNC detection.

Referring back to FIG. 6, the same four 32 symbol DMF structure 602 and 612 are implemented on the serial I and Q signal lines to produce four I DMF and four Q DMF output signals. As shown, the four 32 symbol DMF sectors are executed during the same time interval. The same 64 time delay elements, F/F 702 (FIG. 7), are used to implement each of the four 32-symbol DMFs 604*a-d*, because the DMF operates at twice the symbol rate. The same SYNC sequence is used for the four 32 symbol I DMF 602 and Q DMF 612, because of the serially formatted waveform.

The four I and Q DMF output signals provide a correlation strength estimate for the adaptive SYNC threshold processing by taking a magnitude, or a squared magnitude, of the four I and four Q 32 symbol SYNC sectors using respective magnitude detectors 606. The squared magnitude for each of the DMF I and Q output signal pairs can be obtained by squaring the DMF I and Q signal and then combining the squared values. The magnitude for each of the DMF I and Q output signal pairs is then obtained by taking the squared root of the squared magnitude value.

The squared magnitude approach results in a SYNC correlation response equal to the squared QBL-MSK correlation function, while the magnitude approach produces the QBL-MSK correlation function. The correlation response for the squared QBL-MSK autocorrelation function is sharper than the QBL-MSK autocorrelation function, as expected.

FIG. 8 shows the output signal for QBL-MSK autocorrelation function 802 and squared QBL-MSK autocorrelation function 804, respectively. Either output may be used for correlation strength estimation, but typically the magnitude is used, because it can be implemented using the following equation:

$$S_k(0.5nT_s) = \qquad \text{(eqn 27)}$$
$$\text{Max}\{MAG[IDMF_k(0.5nT_s)], MAG[QDMF_k(0.5nT_s)]\} +$$
$$\frac{1}{2} \cdot \text{Min}\{MAG[IDMF_k(0.5nT_s)], MAG[QDMF_k(0.5nT_s)]\},$$
$$\text{for } k = 1, 2, 3, \& 4;$$

where Max{ } is the maximum value of its two arguments, Min{ } is the minimum value of its two arguments, and Mag[ ] is the magnitude of its argument.

Referring back to FIG. 6, magnitude detectors 606 are used to implement the correlation strength estimation for the four 32 symbol DMF outputs. The four correlation strength estimations ($S_1$, $S_2$, $S_3$, and $S_4$) are sent to adaptive sync threshold adjustment module 616 to control the SYNC threshold level. Because the four correlation strength estimations are based on the DMF using four different sequences during the same time observation window, the correlation strength estimations consist of four QBL-MSK correlation functions each separated by 32 symbols, as the received SYNC sequence slides through the DMFs.

Figure 12:
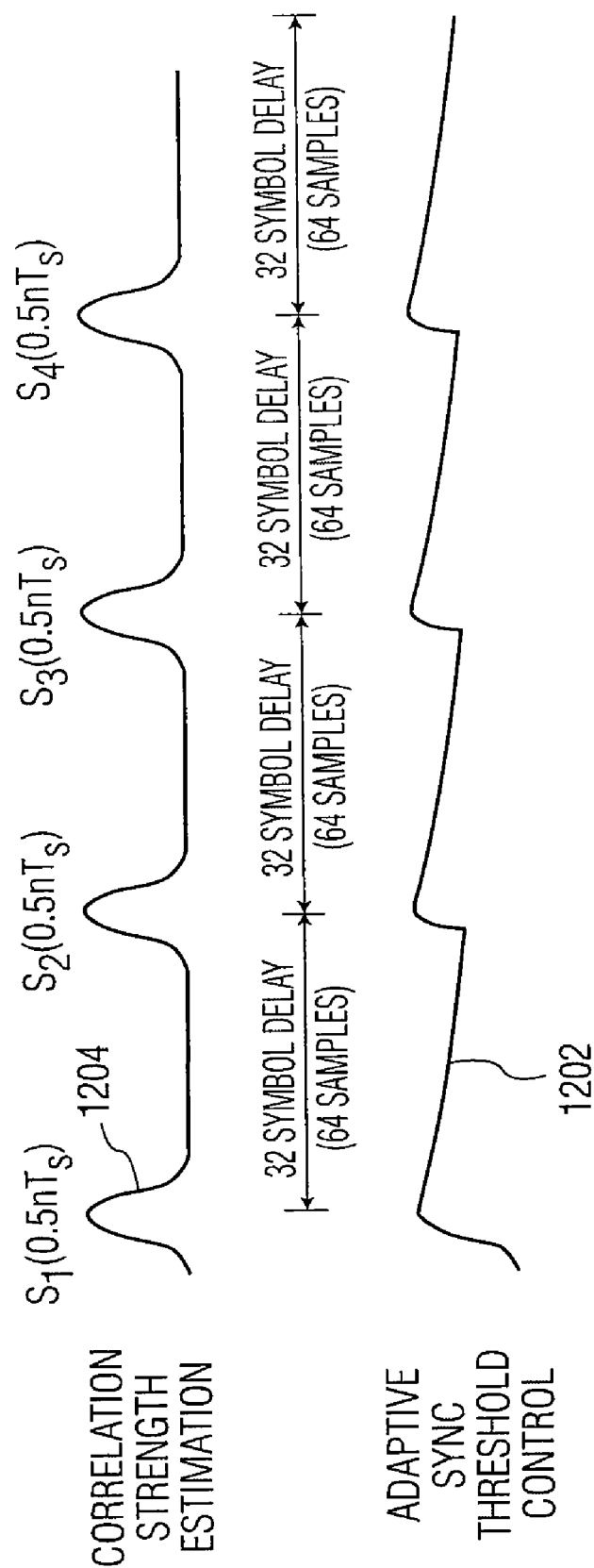
FIG. 12 is an illustrative example of an adaptive SYNC threshold control signal and a correlation strength estimation signal, in accordance with an embodiment of the present invention.
Figure 14:
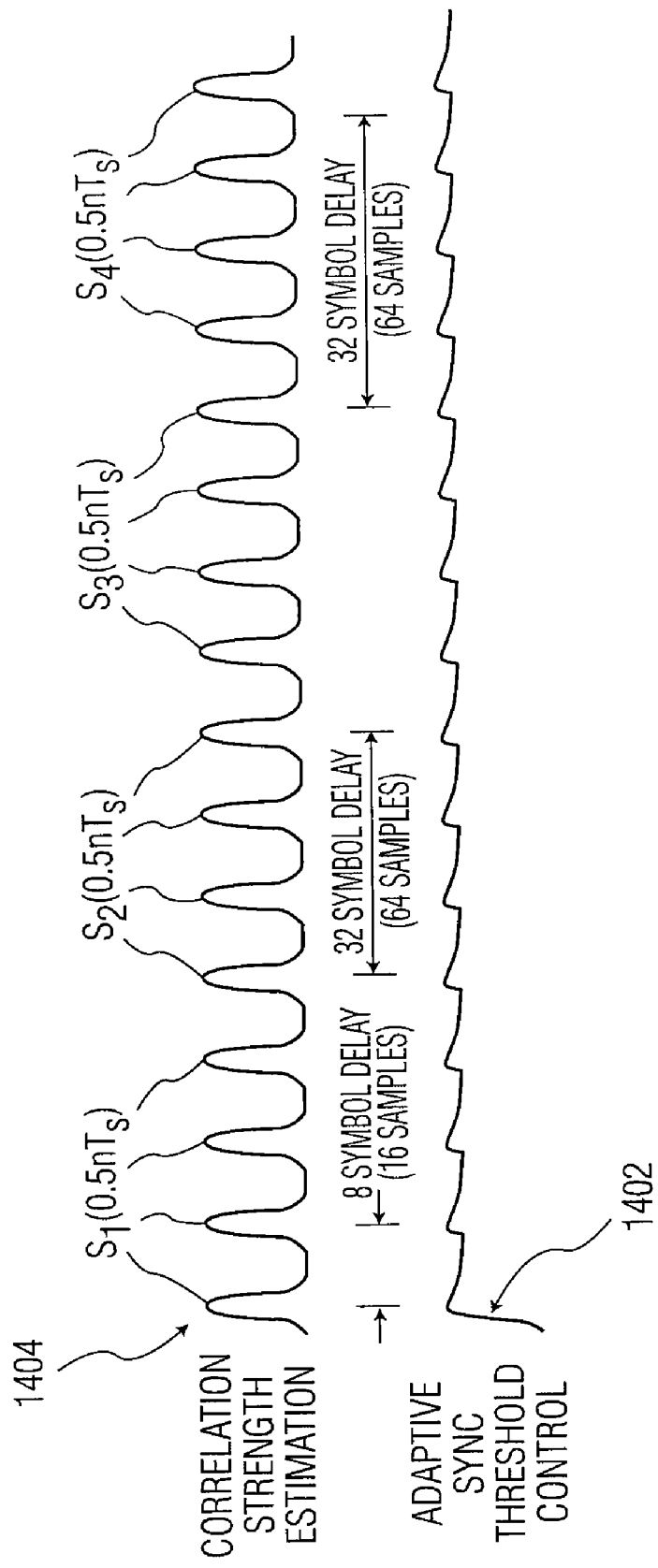
FIG. 14 is an illustrative example of an adaptive SYNC threshold control signal having a fast decay response and a correlation strength estimation signal, in accordance with an embodiment of the present invention.

Accordingly, the adaptive control signal consists of the four QBL-MSK correlation functions from the respective outputs of magnitude detectors 606, which are processed in adaptive sync threshold adjustment module 616 to provide the correlation strength estimation across each 32 symbol interval. Because each of the four QBL-MSK correlation functions provide the correlation strength estimations for only a few samples (as shown in FIG. 8), signal processing may be used to maintain this estimation across the 32 symbol interval between QBL-MSK correlation functions, as shown in FIGS. 12 and 14.

For a low correlation strength estimate, the SYNC threshold level may be set to its lowest value, so SYNC detection may be achieved at the receiver. As the correlation strength estimate increases, the SYNC threshold may be increased to prevent false SYNC introduced by cross-correlation peaks, as the received SYNC sequence slides through the reference SYNC sequence.

The adjusted SYNC threshold level is desirably used as a reference to determine the occurrence of SYNC, by comparing it against the output of peak detector 614 in comparator 618. Peak detector 614 compares the present correlation sample {COR(k)} to the past {COR{k−1}} and future {COR(k+1)} correlation samples to determine if the present correlation sample is a peak. If the detected peak is higher than the SYNC threshold level, SYNC is declared.

Figure 9:
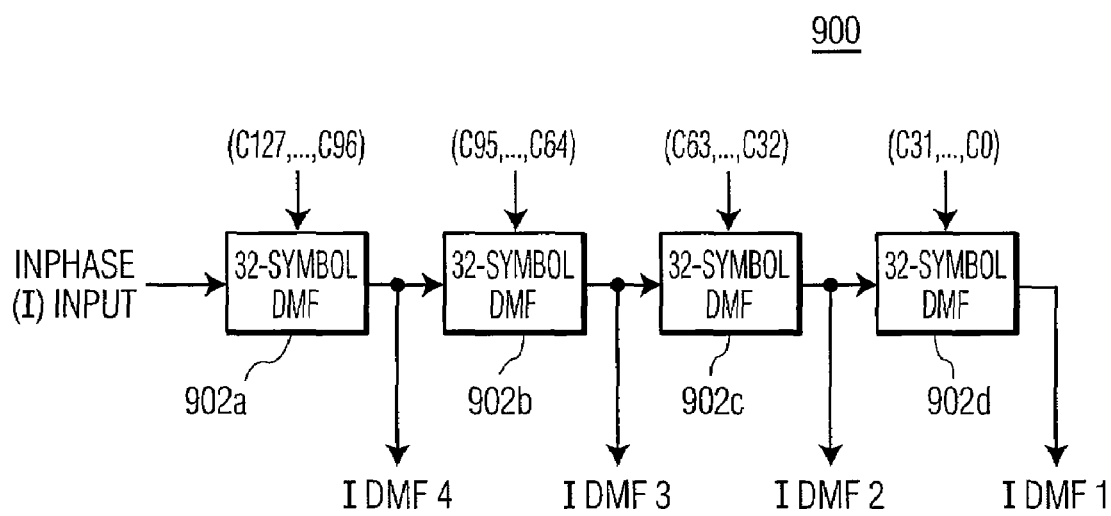
FIG. 9 is a block diagram of a DMF structure.

To determine the SYNC level, the DMF I and Q signals are desirably aligned so that the four QBL-MSK correlation functions add at the same point in time. FIG. 9 shows DMF module 900 with four 32 symbol DMFs 902*a-d*, in series, which provides this alignment. DMF module 900, however, is not able to provide an adaptive control signal consisting of the four QBL-MSK correlation functions for four correlation strength estimations, as the received SYNC sequence slides through the DMF structures. It is thus more desirable to use the four parallel structures of DMFs 602 and 612 (FIG. 6) for generation of the adaptive control signal, instead of the four serial structure, shown in FIG. 9 by DMF 900.

For SYNC detection, time alignment of the four QBL-MSK correlation functions is desired. This time alignment comes automatically with DMF 900 (FIG. 9). For the parallel structure of DMF 602 and DMF 612, however, three delay elements 608*a-c* are used for both the I and Q side to provide the proper time alignment, as shown in FIG. 6.

Still referring to FIG. 6, the 32 symbol DMF 604*a* with SYNC reference symbols $c_0$ to $c_{31}$ uses a 96 symbol delay element 608*a* (192 samples for 2 samples per symbol). The 32 symbol DMF 604*b* with SYNC reference symbols $c_{32}$ to $c_{63}$ uses a 64 symbol delay element 608*b* (128 samples for 2 samples per symbol). The 32 symbol DMF 604*c* with SYNC reference symbols $c_{64}$ to $c_{95}$ uses a 32 symbol delay element 608*c* (64 samples for 2 samples per symbol).

The properly time aligned four I and Q DMF outputs are then combined together by combiner network 610 to obtain the SYNC correlation signal. This combining operation may be a complicated process that corrects for the carrier frequency error, or it may be a simple process that adds the four magnitudes on the I and Q DMF outputs.

Figure 10:
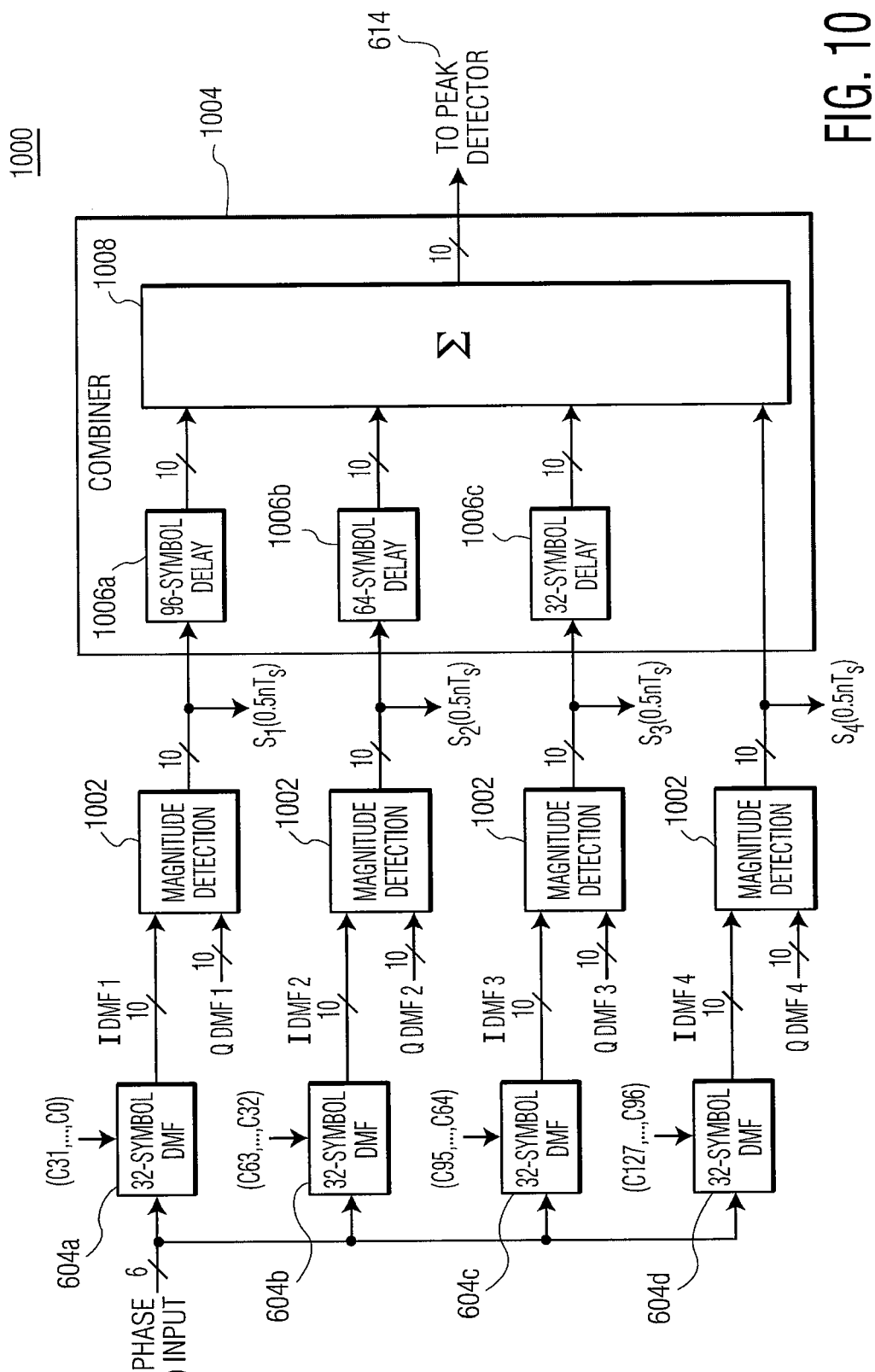
FIG. 10 is a block diagram of a SYNC combining structure, in accordance with an embodiment of the present invention.

FIG. 10 shows an exemplary SYNC combiner 1000, which uses the same magnitude detector 1002 for correlation strength estimation and SYNC detection as the system shown in FIG. 6. A serial I signal is provided to 32 symbol DMFs 604*a-d*, as shown. After magnitude detectors 1002 performs correlation strength estimation, the outputs of magnitude detectors 1002 are provided to symbol delay elements 1006*a-c* to be delayed, as described above. Combiner 1004 combines the three outputs of symbol delay elements 1006*a-c* and the output of magnitude detector 1002 for the $c_{96}$ to $c_{127}$ correlation segment using summer 1008. Peak detector 614 (FIG. 6) receives the signal from summer 1008 and finds the peaks of the correlation samples by comparing the present correlation sample {COR(k)} to the past {COR(k−1)} and future {COR(k+1)} correlation samples. Correlation peaks provided by the peak detector are compared against the SYNC threshold, which is adjusted by the correlation signal strength estimations. If a peak level exceeds the SYNC threshold, SYNC is detected, as previously described.

Figure 11:
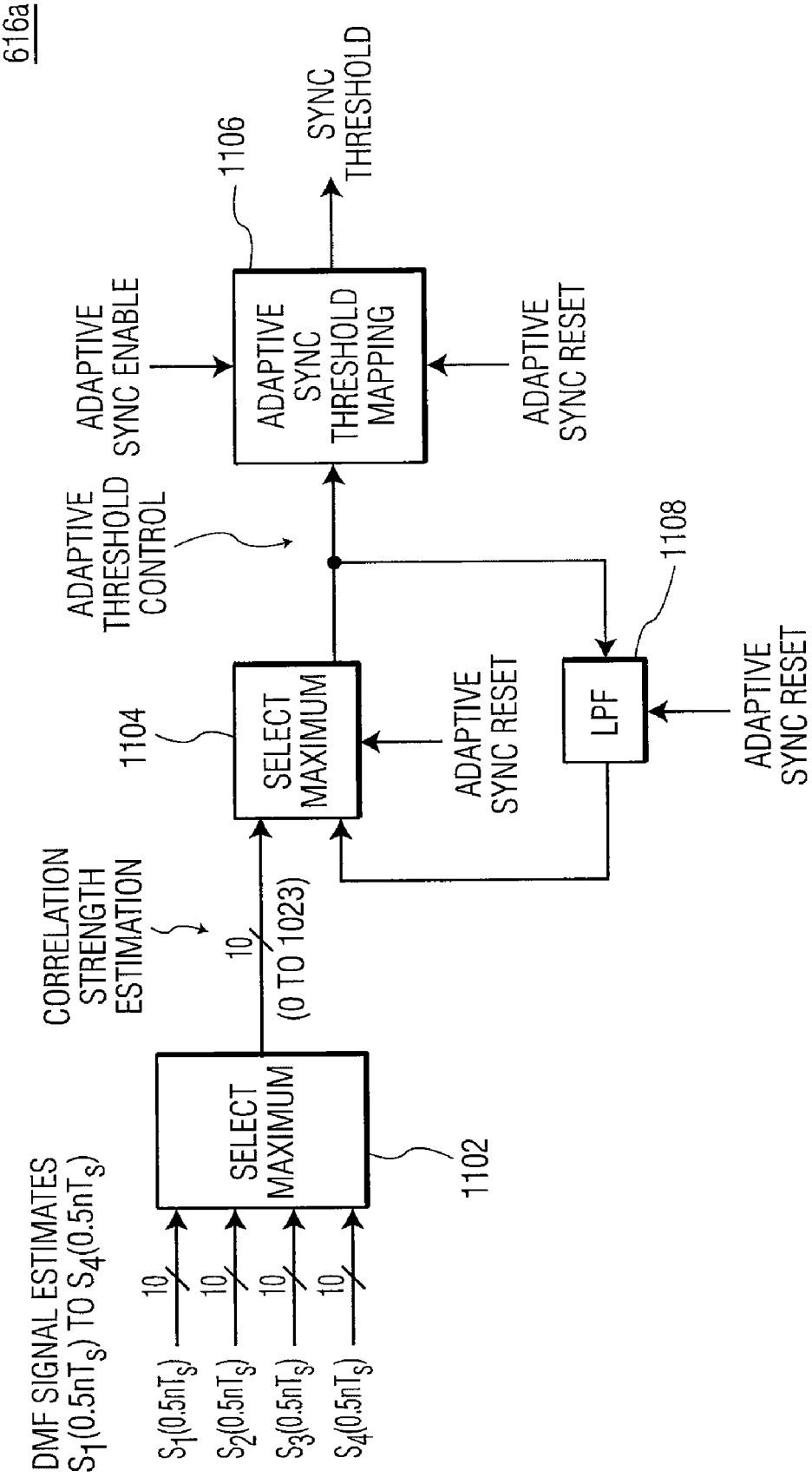
FIG. 11 is a block diagram of an adaptive SYNC threshold adjustment module, in accordance with an embodiment of the present invention.

FIG. 11 shows a detailed block diagram of an exemplary adaptive SYNC threshold adjustment module 616, previously described with respect to FIG. 6. The adaptive SYNC threshold adjustment module is designated as 616*a* in FIG. 11. The maximum value of the four correlation strength estimations ($S_1, S_2, S_3$, and $S_4$) is selected by selector 1102 on a sample by sample basis with the largest sample selected for further processing. Because the four correlation strength estimations ($S_1, S_2, S_3$, and $S_4$) are magnitude values, which are positive values only, no sign information is involved and a direct magnitude level comparison can be done.

Because the QBL-MSK correlation function may provide correlation strength estimations for only a few samples, maximum signal selector 1104 and lowpass filter 1108 are provided to receive the correlation strength estimations. In operation, if the input signal, received from maximum selector 1102, is longer than the output from lowpass filter 1108, that input signal is selected by maximum signal selector 1104 and sent back to lowpass filter 1108 and forward to adaptive SYNC threshold mapping module 1106. If, on the other hand, the input signal from maximum selector 1102 is smaller than the output from the lowpass filter, then the output from lowpass filter 1108 is selected by maximum signal selector 1104 and sent back to the lowpass filter and forward to adaptive SYNC threshold mapping module 1106. Continued feedback to the lowpass filter results in the lowpass filter output signal decaying with time, based on a predetermined time constant. This exemplary operation provides a fast rise time, but a slow decay time from the peak signal. In the exemplary embodiment, the rise time is within one sample, while the decay time is set by the time constant in the lowpass filter.

FIG. 12 shows the adaptive SYNC threshold control signal, designated as 1202 having a specific decay time. As the decay time is increased, adaptive SYNC threshold control signal 1202 decays more slowly across the 32 symbol time interval and the threshold control signal may then be slow to respond to signal peaks of correlation strength estimation introduced by cross-correlation signals and interference signals. It will be appreciated that signal 1204 is the correlation strength estimation signal output from selector 1102 and signal 1202 is the Adaptive SYNC threshold control used to determine the SYNC threshold output from module 1106.

Figure 13:
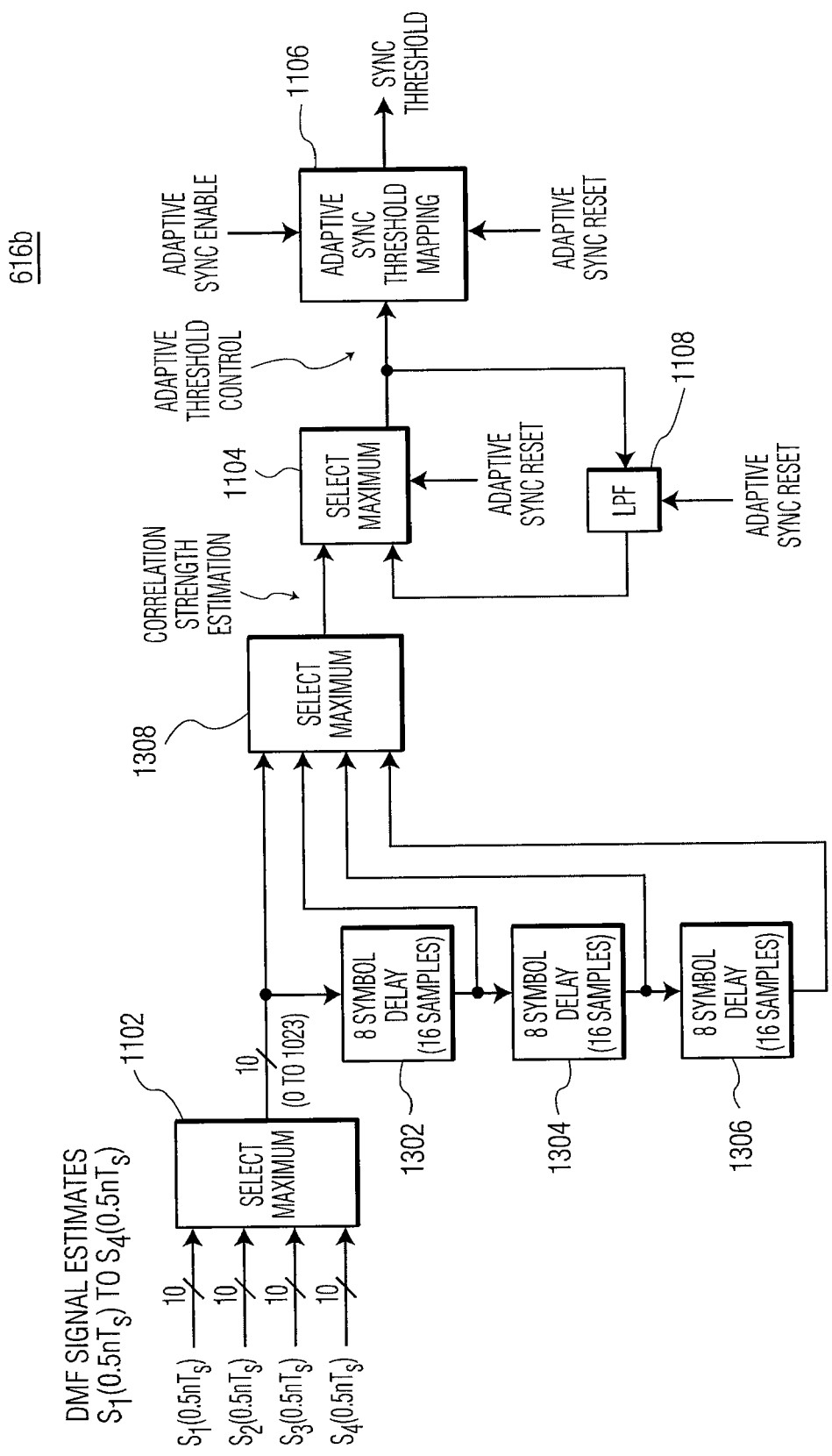
FIG. 13 is a block diagram of an alternative adaptive SYNC threshold adjustment module having a fast decay response, in accordance with an embodiment of the present invention.

The decay time may be reduced while providing less variation in the adaptive SYNC threshold control signal across the 32 symbol time interval by introducing a time shifted segment of the correlation strength estimator signal, as shown in FIG. 13. This figure shows another exemplary embodiment of adaptive SYNC threshold adjustment module 616 (FIG. 6), designated as 616*b*. As described above, correlation strength estimates $S_1, S_2, S_3$, and $S_4$ are compared by maximum selector 1102. Time delays by time shift modules 1302, 1304 and 1306 are applied to the output from maximum selector 1102. A second maximum selector 1308 processes the outputs of maximum selector 1102 and the time delay outputs, respectively, from time shift modules 1302, 1304 and 1306. The largest sample is selected as an output from selector 1308 for further processing.

Processing continues, as previously described, using maximum signal selector 1104 and lowpass filter 1108. The output of maximum signal selector 1104 is sent to adaptive SYNC threshold mapping module 1106 for further processing, producing the adaptive SYNC threshold control signal, designated as 1402 in FIG. 14. The time shifted segments of the correlation strength estimator signal, designated as 1404 is used as an input signal to produce output signal 1402. Because the correlation peaks are closer together, the decay time may be reduced, as shown.

Although in the exemplary embodiments a lowpass filter with a predetermined time constant is used to provide a slow decay time, it is also within the scope of the present invention to use a counter. The counter may hold the peak of the signal for a predetermined time period, unless a stronger peak occurs within the time period. In such case, the system may reset the counter.

Referring back to FIG. 11 or FIG. 13, the adaptive SYNC threshold control signal is sent to adaptive SYNC threshold mapping module 1106, which sets the SYNC threshold level based on the estimated correlation strength. For a low correlation strength estimate, the SYNC threshold level may be set to its lowest value, so SYNC detection may be achieved. As the correlation strength estimate increases, the SYNC threshold may be increased to prevent false SYNC introduced by cross-correlation peaks, as the received SYNC sequence slides through the reference SYNC sequence. Because the adaptive SYNC threshold control signal varies across the SYNC reception, the adaptive SYNC threshold values may be mapped using a look-up table (LUT) which is divided into different SYNC threshold values over an adaptive SYNC threshold control range. For example, the adaptive SYNC threshold mapping may include four ranges divided based on system design parameters.

In summary, the present invention provides a rapid synchronization (SYNC) process using an adaptive SYNC threshold, which may be implemented in hardware or software. The present invention substantially reduces false SYNC detections and false alarms by using a known synchronization (SYNC) pattern for a serially formatted QBL-MSK modulation signal. Serial formatting of the modulation waveform is selected to reduce SYNC correlation complexity.

The method of the present invention may be applied to other types of demodulator architectures, such as a demodulator architecture using four correlators, by making the appropriate changes to the correlation structure. Besides QBL-MSK, the adaptive SYNC approach may be applied to other quadrature modulation waveforms. To simplify the SYNC and adaptive SYNC threshold process, it is desirable that these waveforms be serially formatted.

The method of the present invention may also be applied to Binary Phase Shift Keying (BPSK) or filtered BPSK, where serial formatting is not used, to provide the reduced SYNC complexity.

For other similar and non-similar disclosures, please refer to the following five applications filed on the same day as this application. These five applications are TBD (and, respectively, correspond to the following five provisional applications 60/703,316; 60/703,180; 60/703,179; 60/703,373; and 60/703,320). These applications are all incorporated herein by reference in their entireties.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for synchronization (SYNC) detection of a received serial offset quadrature pulse shaped waveform modulated by a predetermined SYNC sequence of symbols, the method comprising the steps of:
   a) serially demodulating the received waveform into a serial baseband signal having the same predetermined SYNC sequence of symbols;
   b) correlating the serial baseband signal with a plurality of segments of the SYNC sequence of symbols to form a plurality of parallel correlated output signals, the plurality of segments forming the predetermined SYNC sequence of symbols;
   c) combining the parallel correlated output signals to form a combined correlation signal;
   d) detecting SYNC using the combined correlation signal;
   e) determining a peak of the combined correlation signal;
   f) computing correlation strength estimates of each of the parallel correlated output signals;
   g) adjusting a SYNC threshold level based upon the correlation strength estimates; and
   h) comparing the peak of step (e) with the SYNC threshold level of step (g) to detect SYNC.

2. The method according to claim 1, wherein the received serial offset quadrature pulse shaped waveform includes one of minimum shift keying (MSK), Gaussian MSK, serial quasi-bandlimited-MSK (SQBL-MSK), binary phase shift keying (BPSK), filtered BPSK, offset quadrature PSK (OQPSK), intersymbol jitter free OQPSK (IJF-OQPSK), raised cosine filtered OQPSK (RC-OQPSK), continuous phase modulation (CPM), or tamed frequency modulation (TFM).

3. The method according to claim 1, wherein the received waveform has a symbol rate and step (a) includes:
   demodulating the received waveform with a carrier frequency signal to form a baseband signal; and
   sampling the baseband signal at a rate of twice the symbol rate.

4. The method according to claim 1, wherein step (a) includes forming in-phase (I) and quadrature (Q) baseband signals.

5. The method according to claim 1, wherein the received waveform has a symbol rate and step (a) includes:
   demodulating the received waveform to form in-phase (I) and quadrature (Q) baseband signals, each of the I and Q baseband signals sampled at a rate of twice the symbol rate; and
   phase-rotating each of the I and Q baseband signals to form serially demodulated I and Q baseband signals, each of the serial I and Q baseband signals having the same predetermined SYNC sequence of symbols.

6. The method according to claim 1, wherein a number of segments is 4 segments.

7. The method according to claim 1, wherein the SYNC sequence includes 128 symbols, divided into 4 segments each of 32 symbols.

8. The method according to claim 1, wherein step (b) includes:
   aligning in time a first set of symbols of one segment of the SYNC sequence with a second set of symbols of another segment of the SYNC sequence; and
   concurrently correlating the first set of symbols and the second set of symbols with the serial baseband signal to form the parallel correlated output signals.

9. The method according to claim 1, wherein step (b) includes:
   sampling the serial baseband signal at a rate greater than or equal to twice a symbol rate of the SYNC sequence of symbols; and
   correlating the serial baseband signal with one of the segments of the SYNC sequence of symbols by multiplying every other sample of the serial baseband signal with the SYNC sequence of symbols.

10. The method according to claim 1, wherein the parallel correlated output signals includes pairs of correlated in-phase (I) and quadrature (Q) signals, each pair corresponding to one of segments, and step (f) includes:
    computing one of a magnitude signal or a squared magnitude for each of the pairs.

11. The method according to claim 10, wherein computing the squared magnitude includes:
    computing a squared magnitude for each pair of the correlated I and Q output signals; and
    combining the squared magnitude of each of the pairs to form the squared magnitude.

12. The method according to claim 11, wherein computing the magnitude includes computing a square root of the squared magnitude.

13. The method according to claim 1, wherein step (c) includes:
    selectively delaying each of the parallel correlated output signals, so that the parallel correlated output signals are time aligned; and
    combining the parallel correlated output signals after time alignment to form the combined correlation signal.

14. The method according to claim 3, further including correcting an error in the carrier frequency, after detecting SYNC.

15. The method according to claim 1, wherein step (e) includes comparing a value of a present correlation sample COR(k) in the combined correlation signal to a value of a past sample COR(k−1) and a value of a future sample COR(k+1), where k is an integer, and selecting a largest value as the peak.

16. The method according to claim 1 wherein step (g) includes:
   selecting a maximum value from the correlation strength estimates to form a current value;
   comparing the current value to a previously selected maximum value of a correlation strength estimate; and
   adjusting the SYNC threshold level based on the comparison,
   wherein the current value is selected as the SYNC threshold value when the current value is greater than the previously selected value.

17. The method according to claim 16, wherein the SYNC threshold level is lowpass filtered at a predetermined time constant.

18. The method according to claim 16, wherein the SYNC threshold level is adjusted by mapping the selected maximum value from the correlation strength estimates into the SYNC threshold level using a look up table (LUT) stored in a memory.

19. A method for synchronization (SYNC) detection of a received serial offset quadrature pulse shaped waveform modulated by a predetermined SYNC sequence of symbols, the method comprising the steps of:
   a) serially demodulating the received waveform into a serial baseband signal having the same predetermined SYNC sequence of symbols;
   b) simultaneously correlating the entire serial baseband signal with each of a plurality of segments of the SYNC sequence of symbols to form a plurality of parallel correlated output signals, the plurality of segments forming the predetermined SYNC sequence of symbols;
   c) computing correlation strength estimates of each of the parallel correlated output signals;
   d) combining the correlation strength estimates to form a combined correlation signal; and
   e) detecting SYNC using the combined correlation signal;
   wherein step (d) includes:
   selectively delaying each of the correlation strength estimates, so that the correlation strength estimates are time aligned; and
   combining the correlation strength estimates after time alignment to form the combined correlation signal.

20. The method according to claim 19, further including the steps of:
   f) determining a peak of the combined correlation signal;
   g) adjusting a SYNC threshold level based upon the correlation strength estimates; and
   h) comparing the peak of step (f) with the SYNC threshold level of step (g) to detect SYNC.

21. The method according to claim 19, wherein the received serial offset quadrature pulse shaped waveform includes one of minimum shift keying (MSK), Gaussian MSK, serial quasi-bandlimited-MSK (SQBL-MSK), binary phase shift keying (BPSK), filtered BPSK, offset quadrature PSK (OQPSK), intersymbol jitter free OQPSK (IJF-OQPSK), raised cosine filtered OQPSK (RC-OQPSK), continuous phase modulation (CPM), or tamed frequency modulation (TFM).

22. The method according to claim 19, wherein the received waveform has a symbol rate and step (a) includes:
   demodulating the received waveform to form in-phase (I) and quadrature (Q) baseband signals, each of the I and Q baseband signals sampled at a rate of twice the symbol rate; and
   phase-rotating each of the I and Q baseband signals to form serially demodulated I and Q baseband signals, each of the serial I and Q baseband signals having the same predetermined SYNC sequence of symbols.

23. The method according to claim 19, wherein step (b) includes:
   aligning in time a first set of symbols of one segment of the SYNC sequence with a second set of symbols of another segment of the SYNC sequence; and
   concurrently correlating the first set of symbols and the second set of symbols with the serial baseband signal to form the parallel correlated output signals.

24. The method according to claim 20, wherein step (g) includes:
   selecting a maximum value from the correlation strength estimates to form a current value;
   comparing the current value to a previously selected maximum value of a correlation strength estimate; and
   adjusting the SYNC threshold level based on the comparison,
   wherein the current value is selected as the SYNC threshold value when the current value is greater than the previously selected value.

25. A receiver comprising:
   a demodulator for serially demodulating a received waveform into a serial baseband signal, the serial baseband signal having a predetermined SYNC sequence of symbols; a matched filter for correlating the serial baseband signal with a plurality of segments of the SYNC sequence of symbols to form a plurality of parallel correlated output signals, the plurality of segments forming the predetermined SYNC sequence of symbols; a correlation strength estimator for computing correlation strength estimates of each of the parallel correlated output signals;
   a combiner for combining one of the correlation strength estimates or the parallel correlated output signals to form a combined correlation signal;
   a peak detector for determining a peak in the combined correlation signal;
   a threshold adjustor for adjusting a SYNC threshold level based upon the correlation strength estimates; and
   a comparator for comparing the peak in the combined correlation signal with the SYNC threshold level to detect synchronization when the peak is greater than the SYNC threshold level.

26. The receiver of claim 25, wherein the received waveform includes one of minimum shift keying (MSK), Gaussian MSK, serial quasi-bandlimited-MSK (SQBL-MSK), binary phase shift keying (BPSK), filtered BPSK offset quadrature PSK (OQPSK), intersymbol litter free OQPSK (IJF-OQPSK), rasied cosine filtered OQPSK (RC-OQPSK), bandwidth continuous phase modulation (CPM), or tamed frequency modulation (TFM).

* * * * *